United States Patent
Matsumoto et al.

(10) Patent No.: US 8,590,979 B2
(45) Date of Patent: Nov. 26, 2013

(54) SEATBACK DEVICE

(75) Inventors: Tomoki Matsumoto, Wako (JP); Hiroyuki Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 13/265,444

(22) PCT Filed: Mar. 16, 2010

(86) PCT No.: PCT/JP2010/054404
§ 371 (c)(1),
(2), (4) Date: Oct. 20, 2011

(87) PCT Pub. No.: WO2010/122858
PCT Pub. Date: Oct. 28, 2010

(65) Prior Publication Data
US 2012/0038199 A1 Feb. 16, 2012

(30) Foreign Application Priority Data
Apr. 24, 2009 (JP) .................. 2009-106452

(51) Int. Cl.
*A47C 7/02* (2006.01)
*B60N 2/42* (2006.01)

(52) U.S. Cl.
USPC .............. 297/452.18; 297/284.4; 297/452.56; 297/216.13

(58) Field of Classification Search
USPC ............. 297/452.18, 452.55, 452.56, 216.13, 297/284.4
See application file for complete search history.

(56) References Cited

U.S. PATENT DOCUMENTS

| | | | | |
|---|---|---|---|---|
| 5,044,693 | A * | 9/1991 | Yokota | 297/452.18 |
| 7,731,294 | B2 * | 6/2010 | Yasuda et al. | 297/452.56 X |
| 7,971,939 | B2 * | 7/2011 | Fujita et al. | 297/452.56 |
| 2006/0232114 | A1 | 10/2006 | Sugiyama et al. | |
| 2007/0205643 | A1 | 9/2007 | Fujita et al. | |
| 2009/0102270 | A1 | 4/2009 | Wissner et al. | |

FOREIGN PATENT DOCUMENTS

| | | |
|---|---|---|
| JP | 61-37212 | 2/1986 |
| JP | 2006-20733 | 1/2006 |
| JP | 2006-61406 | 3/2006 |
| JP | 2007-143692 | 6/2007 |
| JP | 2009-101138 | 5/2009 |

* cited by examiner

*Primary Examiner* — Anthony D Barfield
(74) *Attorney, Agent, or Firm* — Rankin, Hill & Clark LLP

(57) ABSTRACT

A seatback device configured to elastically support a planar elastic body between left and right side frames. The seatback device includes left and right first springs and left and right second springs. The left and right first springs have axes respectively, extending in the width direction of the vehicle. The upper parts of the left and right sides of the planar elastic body body are connected to the left and right side frames through the left and right first springs. The left and right second springs have axes, respectively, extending in the front-and-rear direction of the vehicle body. The lower parts on the left and right sides of the planar elastic body are connected to the left and right side frames through the left and right second springs.

6 Claims, 9 Drawing Sheets

SEATBACK DEVICE

TECHNICAL FIELD

The present invention relates to a seatback device in which a pair of left and right lateral frames is provided to a seatback frame and a planar elastic body is elastically supported between the left and right lateral frames.

BACKGROUND ART

As disclosed e.g. in patent literature 1, there is known in the art an automotive seatback device used in a vehicle, in which left and right lateral frames are provided on a seatback frame, a planar elastic body for supporting a cushioning material is provided between the left and right lateral frames, a left side portion of the planar elastic body is connected to the left lateral frame with a plurality of left coil springs, a right side portion of the planar elastic body is connected to the right lateral frame with a plurality of right coil springs, and the planar elastic body is supported against the left and right lateral frames with the left and right coil springs.

Supporting the planar elastic body using the left and right coil springs deforms the left and right coil springs so that the planar elastic body can fit with the back of a vehicle occupant.

Normally, a head rest is provided at a top portion of the seat back. The head rest is positioned at a relative distance from the head of the vehicle occupant under normal driving conditions. As a result, it is difficult for the headrest to satisfactorily support the head of the vehicle occupant in an instance where another vehicle collides into a rear portion of the vehicle (i.e., a rear collision).

One way to address this problem is to support the planar elastic body so that the upper body of the vehicle occupant moves towards the rear of the vehicle body and the headrest supports the head, as with the seat back disclosed in patent literature 1. In other words, in an instance where another vehicle collides with the rear portion of the vehicle (i.e., a rear collision), the left and right coil springs stretch, the upper body of the vehicle occupant moves towards the rear of the vehicle body together with the planar elastic body, and the headrest supports the head.

However, according to the seatback device of patent literature 1, the left and right coil springs are provided so that an axial line of each of the coil springs is oriented in the direction of vehicle width. As a result, it is difficult to move the upper body of the vehicle occupant towards the rear of the vehicle body in a satisfactory manner, and it is difficult to adequately support the head of the vehicle occupant with the headrest.

Prior Art Reference

Patent Literature 1: JP-A 61-37212

SUMMARY OF THE INVENTION

Technical Problem

An object of the present invention is to provide a seatback device capable of moving the upper body of a vehicle occupant towards the rear of a vehicle body in a satisfactory manner and adequately supporting the head of the vehicle occupant with a headrest.

Solution to Problem

According to one aspect of the present invention, there is provided a seatback device comprising: a seatback frame assembly including a pair of left and right lateral frames, and a planar elastic body elastically disposed between and supported by the left and right lateral frames; a left first spring interconnecting a left-side upper portion of the planar elastic body and the left lateral frame and having an axis extending substantially laterally of a vehicle; a right first spring interconnecting a right-side upper portion of the planar elastic body and the right lateral frame and having an axis extending substantially laterally of the vehicle; a left second spring interconnecting a left-side lower portion of the planar elastic body and the left lateral frame and having an axis extending forward of the seatback frame assembly, the left second spring urging the left-side lower portion forward of the seatback frame assembly; and a right second spring interconnecting a right-side lower portion of the planar elastic body and the right lateral frame and having an axis extending forward of the seatback frame assembly, the right second spring urging the right-side lower portion forward of the seatback frame assembly.

Preferably, the planar elastic body includes a left extending portion extending from the left-side lower portion of the planar elastic body towards the left lateral frame and connected to the left lateral frame through the left second spring, and a right extending portion extending from the right-side lower portion of the planar elastic body towards the right lateral frame and connected to the right lateral frame through the right second spring.

Preferably, each of the left and right lateral frames has a front wall portion, a rear wall portion, and a side wall portion interconnecting outer end portions of the front wall portion and the rear wall portion, wherein the front wall portion, the rear wall portion and the side wall portion define a U-shape cross-section, wherein the left and right lateral frames open toward each other in opposed relation to each other, wherein the left second spring has a front end connected to the front wall portion of the left lateral frame, and the right second spring has a front end connected to the front wall portion of the right lateral frame, and wherein the left second spring has a rear end spaced inward from an inner edge of the rear wall portion and connected to the planar elastic body, and the right second spring has a rear end spaced inward from an inner edge of the rear wall portion and connected to the planar elastic body.

Advantageous Results

According to the present invention, the left- and right-side upper portions of the planar elastic body are connected to the pair of left and right lateral frames via a pair of left and right first springs, respectively, and each of the springs has an axial line extending substantially in the vehicle width direction. The pair of left and right first springs can be thereby used to suspend the planar elastic body as well as to position the planar elastic body. In other words, the first springs can be imparted with a positioning function.

The left- and right-side lower portions of the planar elastic body are connected to the pair of left and right lateral frames by the pair of left and right second springs, respectively. The axial line of each of the pair of left and right second springs is oriented so as to extend further forward of the seatback frame assembly relative to the pair of left and right first springs, so that the pair of left and right second springs pulls the left and right lower portions of the planar elastic body further forward of the seat back assembly (i.e., towards the front of the vehicle body).

A load acting on the planar elastic body towards the rear of the vehicle body ("rearward load" hereafter) can thereby be made to act in an axial direction of each of the pair of left and right second springs. The second springs can therefore be made to elastically deform in correspondence with the rearward load in a satisfactory manner. In other words, the second springs can be imparted with a function of adjusting reactive force characteristics.

Imparting the second springs a function of adjusting reaction force characteristics as described above makes it possible to readily set the amount of bending (i.e., amount of stretching) of the second springs simply by adjusting (i.e., setting) the spring force of the second springs (i.e., the reaction force characteristics).

In other words, the first springs are imparted with a function of positioning the planar elastic body against the seatback frame assembly, and the second springs are imparted with a function of adjusting reaction force characteristics, thereby dividing roles of each of the springs, making it possible to readily set the amount of rearward movement of the vehicle occupant and the planar elastic body during a rear collision simply by adjusting the reactive force characteristics of the second springs.

Normally, the vehicle occupant is thrust into the seat back in relative terms during a rear collision. Therefore, a rearward load acts on the planar elastic body, and the seatback frame tilts slightly about a support shaft towards the rear of the vehicle body. Therefore, unless the movement of the lower portion (i.e., the waist portion) of the vehicle occupant towards the vehicle rear is greater than that of the upper portion (i.e., the chest portion), it is difficult for the movement of the head of the vehicle occupant to reach the head rest (provided to a top portion of the seat back).

As described above, the amount of stretching of the pair of left and right second springs can be readily adjusted (i.e., set) in correspondence with the rearward load. It is therefore possible to cause the upper body (i.e., the waist portion) of the vehicle occupant to move towards the rear of the vehicle body by a predetermined amount in a satisfactory manner (i.e., by a sufficient amount). It is thereby possible to cause the head to move with the upper body so as to reach the headrest, making it possible to adequately support the head with the headrest.

In the present invention, left and right extending portions are respectively extended from left and right lower portions of the planar elastic body. The left extending portion is connected to the left lateral frame by the left second spring, and the right extending portion is connected to the right lateral frame by the right second spring. Therefore, the length of the left and right extending portions can be varied to adjust the orientation of the left and right second springs (i.e., the direction of the reaction force).

Adjusting the orientation of the left and right second springs (i.e., the direction of the reaction force) as described above makes it possible to adjust the spring force of the left and right second springs (i.e., the reaction force characteristics) in a more satisfactory manner and to set the amount of bending of the second springs with greater ease.

In the present invention, the rear end of each of the pair of left and right second springs is connected to the planar elastic body at a position further inward of an inner edge of the rear wall portion of each of the pair of left and right lateral frames, respectively. Therefore, the pair of left and right second springs can be prevented from interfering with the rear wall portion of the pair of left and right lateral frames when the pair of left and right second springs is stretched. It is thereby possible to prevent the pair of left and right lateral frames from blocking the rearward movement of the planar elastic body, which in turn makes it possible for the planar elastic body to move (recede or be displaced) rearward by a satisfactory amount.

DESCRIPTION OF EMBODIMENT

A preferred embodiment of the present invention will be described below with reference to the accompanying drawings.

Figure 1:
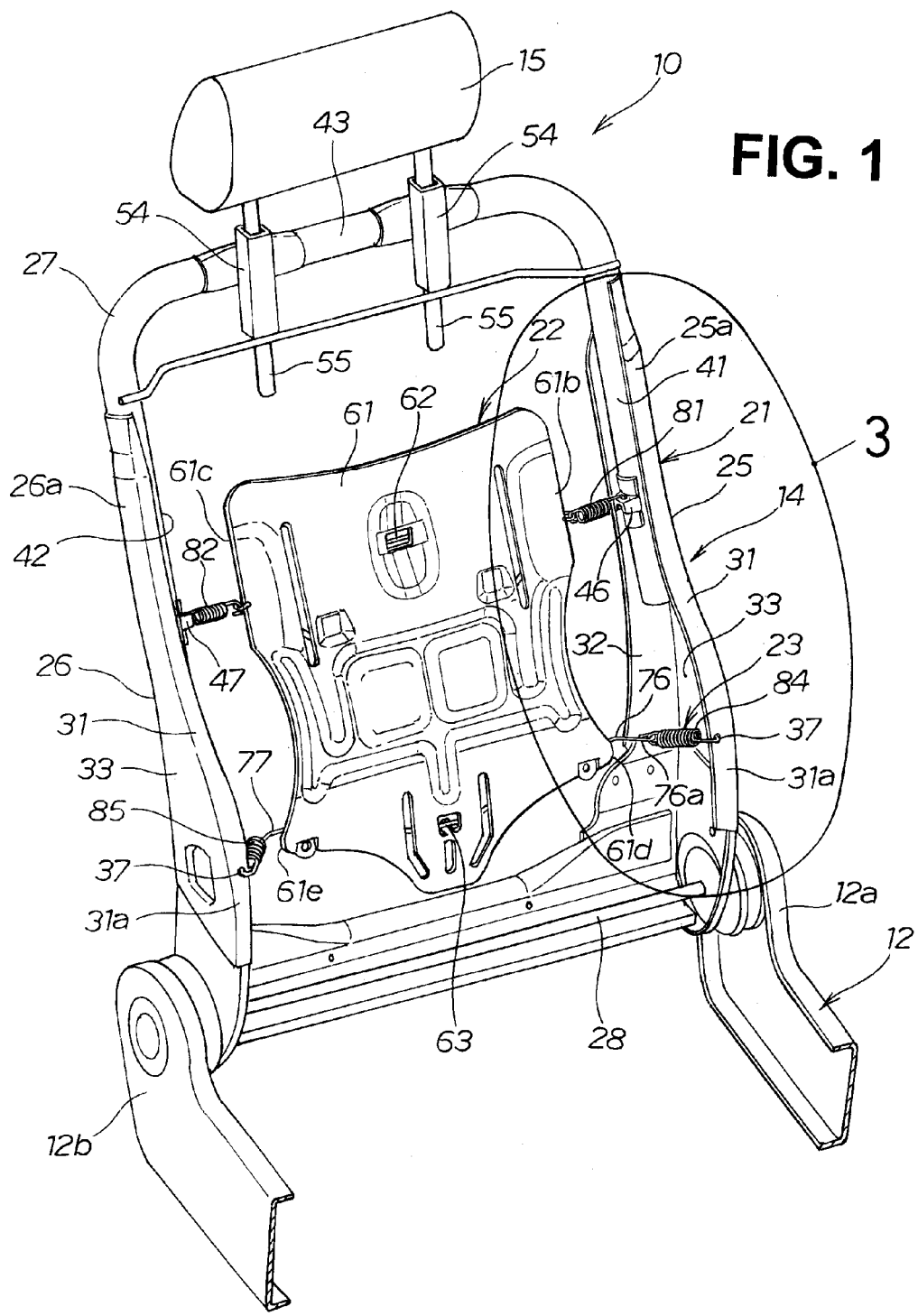
FIG. 1 is a perspective view of a seatback device according to an embodiment of the present invention as viewed from the front.
Figure 2:
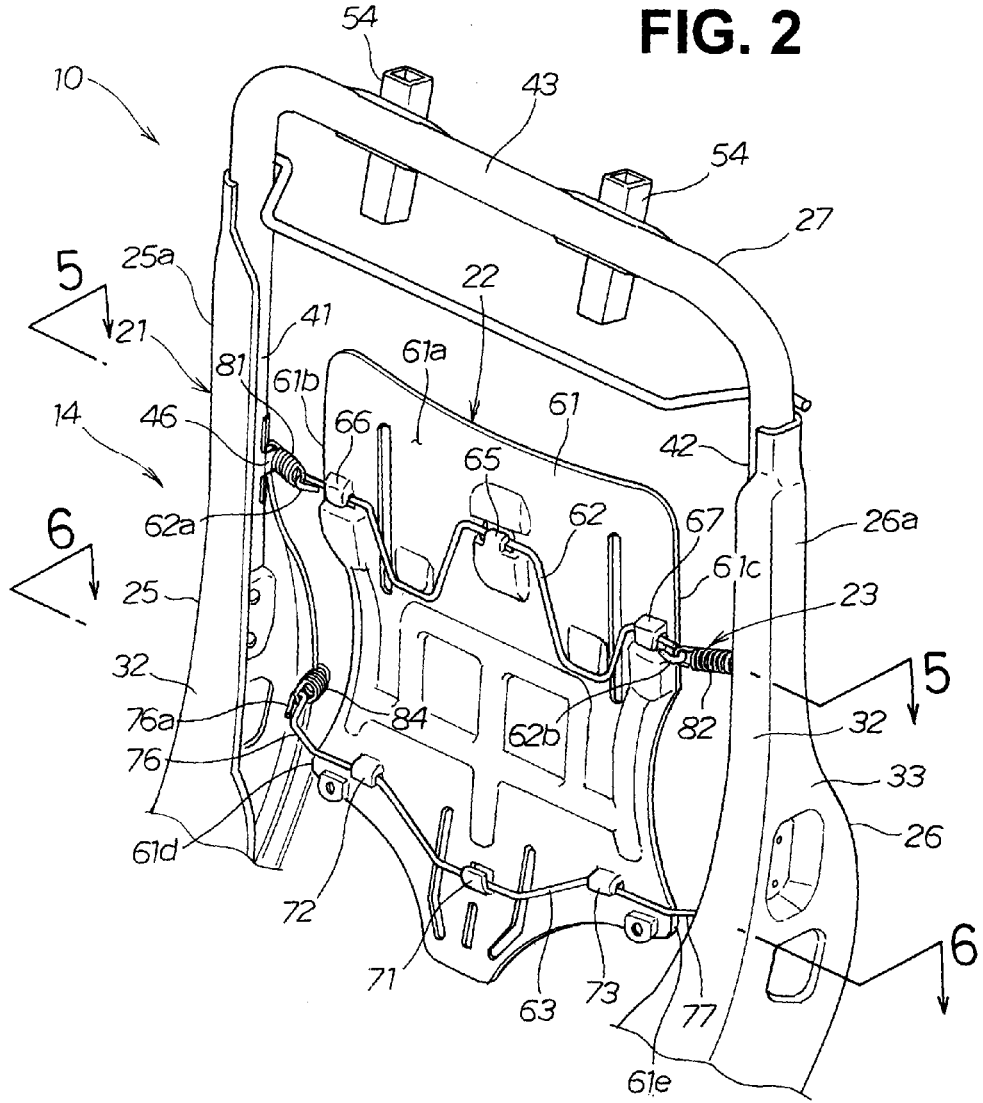
FIG. 2 is a perspective view of the seatback device shown in FIG. 1, as viewed from the rear.

As shown in FIGS. 1 and 2, a seatback device 10 has a seatback frame unit 14 supported by a rear end portion of a seat frame 12, and a head rest 15 provided to the seatback frame unit 14. The seat frame 12 is a frame that forms a framework of a seat cushion for seating a vehicle occupant. The seatback frame unit 14 is a unit that forms structures such as a framework of a seat back against which the upper body of the vehicle occupant rests.

The seatback frame unit 14 has a seatback frame assembly 21 supported by the rear end portion of the seat frame 12, a planar elastic body 22 provided within in the seatback frame assembly 21, and a spring unit 23 for connecting the planar elastic body 22 to the seatback frame assembly 21.

The seatback frame assembly 21 has a left lateral frame 25 provided to a left rear end portion 12a of the seat frame 12 by a support shaft 28 so as to be capable of rotating in the longitudinal direction, a right lateral frame 26 provided to a right rear end portion 12b of the seat frame 12 by a support shaft 28 so as to be capable of rotating in the longitudinal direction, and a connecting frame 27 for connecting the pair of left and right lateral frames 25, 26.

Figure 3:
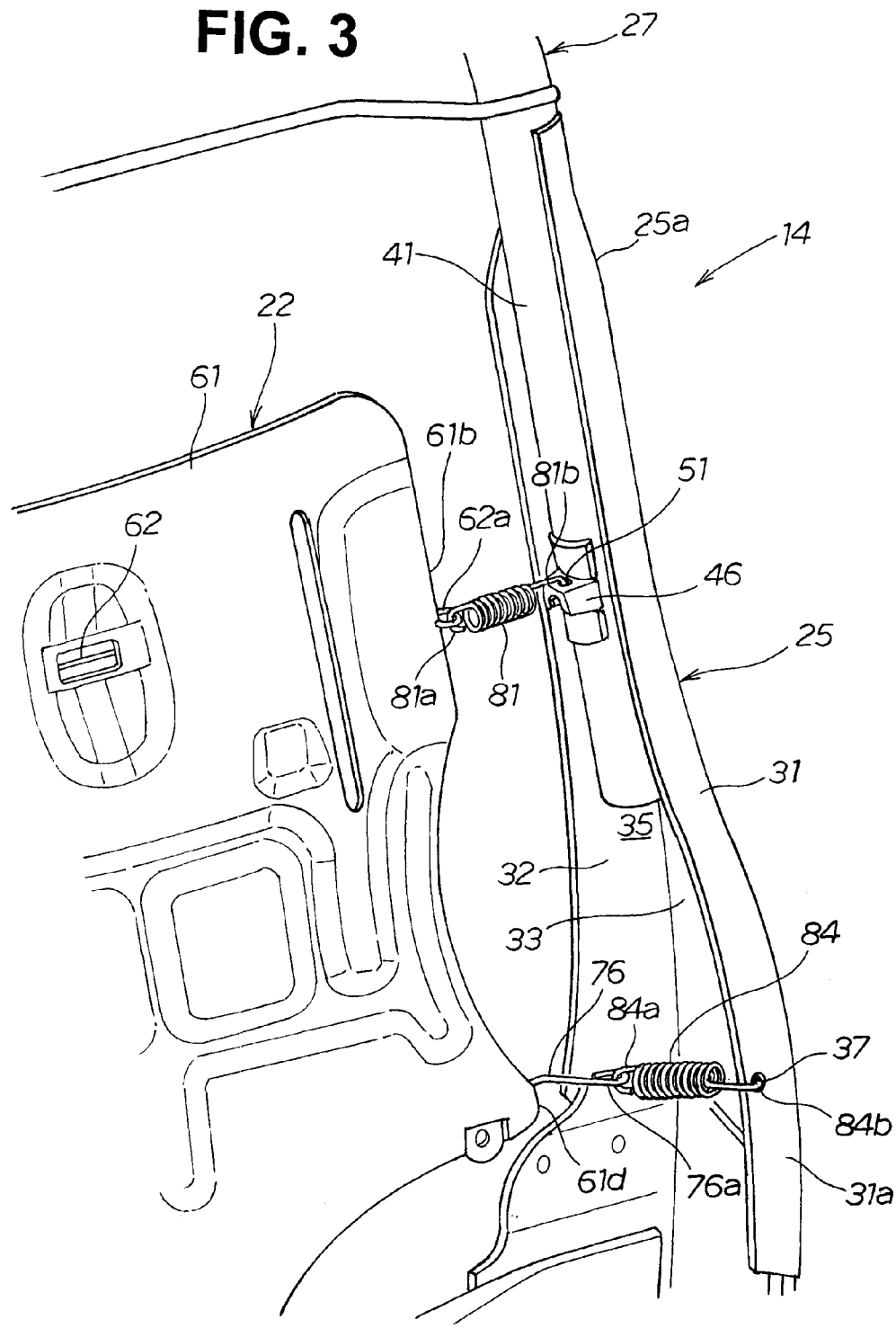
FIG. 3 is an expanded view of a region indicated by a numeral 3 in FIG. 1.
Figure 4:
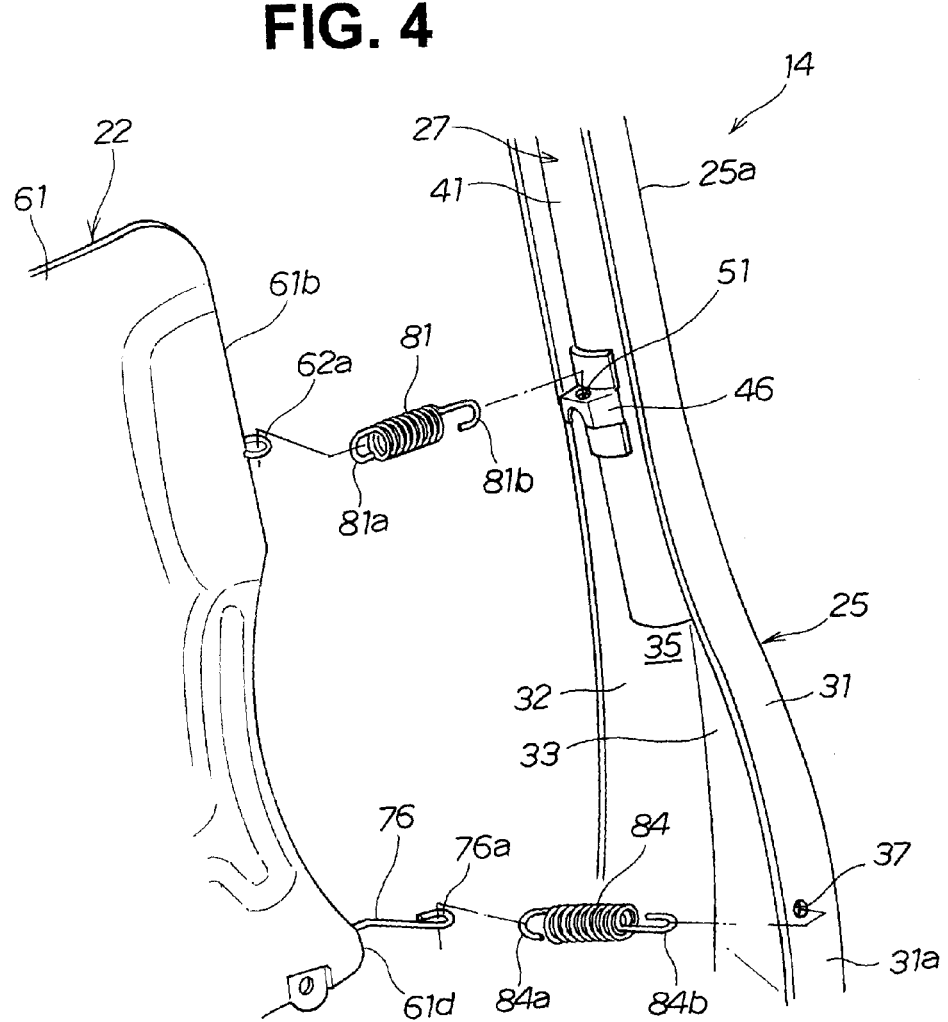
FIG. 4 is an exploded perspective view of the seatback device shown in FIG. 3.

As shown in FIGS. 3 and 4, the left lateral frame 25 has a front wall portion 31, a rear wall portion 32, and a side wall portion 33 for linking the respective outer end portions of each of the front wall portion 31 and the rear wall portion 32, forming a U-shape in cross-section that opens inwards in the vehicle width direction. An upper half portion 25a of the left lateral frame 25 is formed so that the front wall portion 31, the rear wall portion 32, and the side wall portion 33 forms a U-shape in cross section that opens inwards in the vehicle width direction.

Forming the upper half portion 25a of the left lateral frame 25 as a U-shape in cross section results in the formation of a space 35 for accommodating a left leg pipe 41 of the connecting frame 27. A front connecting hole 37 is formed at a lower portion 31a of the front wall portion 31. A front hook (front end) 84b of a left second spring 84 is connected to the front connecting hole 37.

The right lateral frame 26 shown in FIGS. 1 and 2 is bilaterally symmetrical to the left lateral frame 25. Each component member is given a label that is identical to that for the left lateral frame 25 without adding a description.

As shown in FIGS. 1 and 2, the connecting frame 27 has a U-shape formed by a left leg pipe 41, a right leg pipe 42, and a connecting pipe 43 for connecting an upper end of the left leg pipe 41 and an upper end of the right leg pipe 42. In the connecting frame 27, the left leg pipe 41 is provided to the upper half portion 25a of the left lateral frame 25, and the right leg pipe 42 is provided to an upper half portion 26a of the right lateral frame 26.

The left leg pipe 41 shown in FIGS. 3 and 4 is accommodated in the space 35 formed in the upper half portion 25a of the left lateral frame 25, and is joined to the front wall portion 31, the rear wall portion 32, and the side wall portion 33 of the upper half portion 25a. A left connecting bracket 46 is provided to the left leg pipe 41, and a left outer connecting hole 51 is formed on the left connecting bracket 46. An outer hook 81b of a left first spring 81 is engaged in the left outer connecting hole 51.

The right leg pipe 42 shown in FIGS. 1 and 2 is bilaterally symmetrical to the left leg pipe 41, and is accommodated in the space 35 formed in the upper half portion 26a of the right lateral frame 26, and is joined to the front wall portion 31, the rear wall portion 32, and the side wall portion 33 of the upper half portion 26a. A right connecting bracket 47 is provided to the right leg pipe 42. The right connecting bracket 47 is bilaterally symmetrical to the left connecting bracket 46. A right outer connecting hole 52 (FIG. 5) is formed on the right connecting bracket 47. An outer hook 82b of a right first spring 82 (FIG. 5) is engaged in the connecting hole 52.

The connecting pipe 43 is formed substantially horizontally across the upper end of the left leg pipe 41 and the upper end of the right leg pipe 42, and is provided with a pair of support brackets 54, 54. A leg portion 55 of the head rest 15 is provided to each of the pair of support brackets 54, 54.

Figure 7:
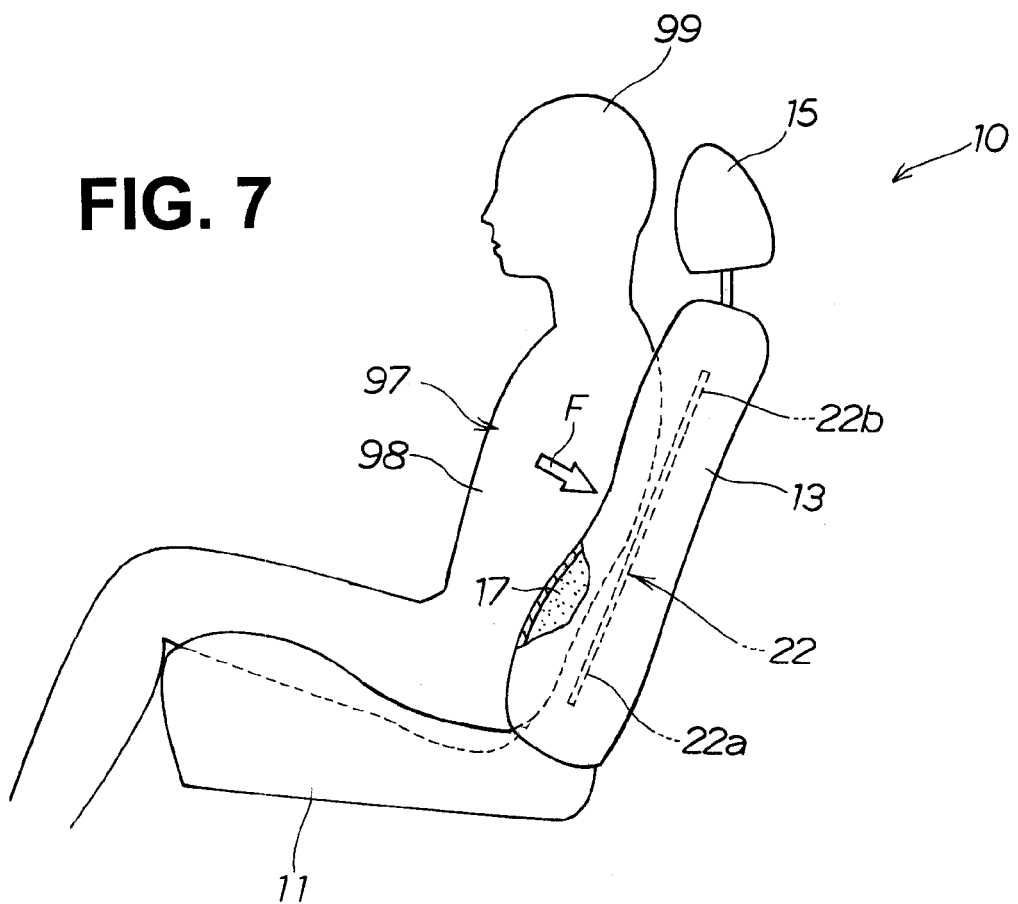
FIG. 7 is a drawing showing an example of a rearward load acting on the seatback device according to the present embodiment.

The planar elastic body 22 is provided between the pair of left and right lateral frames 25, 26. The planar elastic body 22 is elastically supported between the left and right lateral frames 25, 26 by the spring unit 23. The planar elastic body 22 supports a cushioning material 17 of a seat back 13 (FIG. 7). The planar elastic body 22 has a planar plate 61 formed in a substantially rectangular shape, an upper connecting wire 62 provided to an upper portion of a reverse surface 61a of the planar plate 61, and a lower connecting wire 63 provided to a lower portion of the reverse surface 61a of the planar plate 61.

The planar plate 61 is a resin plate, formed in a substantially rectangular shape, for supporting the back surface of the vehicle occupant (or specifically, the cushioning material of the seat back that contacts the back of the vehicle occupant). The planar plate 61 is provided between the left and right lateral frames 25, 26.

The upper connecting wire 62 is, for example, an elastically deformable rod formed with spring steel. A central portion of the upper connecting wire 62 is engaged with an upper central engagement claw 65 of the planar plate 61, a left end portion is engaged with an upper left engagement claw 66 of the planar plate 61, and a right end portion is engaged with an upper right engagement claw 67 of the planar plate 61. The upper connecting wire 62 is thereby attached to the reverse surface 61a of the planar plate 61.

In the state described above, a left inner connecting portion 62a of the upper connecting wire 62 protrudes slightly from a left-side upper portion 61b of the planar plate 61 (see also FIG. 3), and a right inner connecting portion 62b protrudes slightly from a right-side upper portion 61c of the planar plate 61. The left inner connecting portion 62a is a portion that forms a left-side upper portion of the planar elastic body 22. The right inner connecting portion 62b is a portion that forms a right-side upper portion of the planar elastic body 22.

As shown in FIGS. 3 and 4, in the left inner connecting portion 62a, a left end portion of the upper connecting wire 62 is bent to form a connecting hole. The connecting hole at the left inner connecting portion 62a is a hole for connecting an inner hook 81a of the left first spring 81. In other words, the inner hook 81a of the left first spring 81 is connected to the left inner connecting portion 62a.

Figure 5:
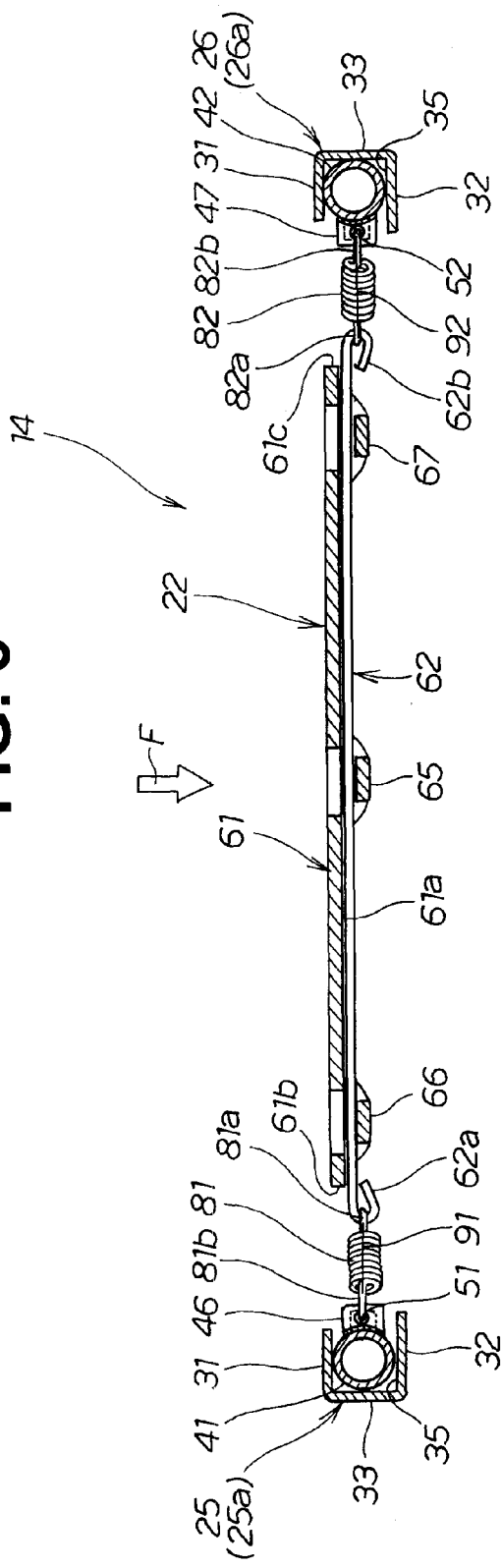
FIG. 5 is a cross-sectional view along the line 5-5 in FIG. 2.

As shown in FIG. 5, in the right inner connecting portion 62b, a right end portion of the upper connecting wire 62 is bent to form a connecting hole. The connecting hole at the right inner connecting portion 62b is a hole for connecting an inner hook 82a of the right first spring 82. In other words, the inner hook 82a of the right first spring 82 is connected to the right inner connecting portion 62b.

As shown in FIGS. 1 and 2, the lower connecting wire 63 is, for example, an elastically deformable rod formed with spring steel. A central portion of the lower connecting wire 63 is engaged with a lower central engagement claw 71 of the planar plate 61, a left portion of the lower connecting wire 63 is engaged with a lower left engagement claw 72 of the planar plate 61, and a right portion of the lower connecting wire 63 is engaged with a lower right engagement claw 73 of the planar plate 61. The lower connecting wire 63 is thereby attached to the reverse surface 61a of the planar plate 61.

Figure 6:
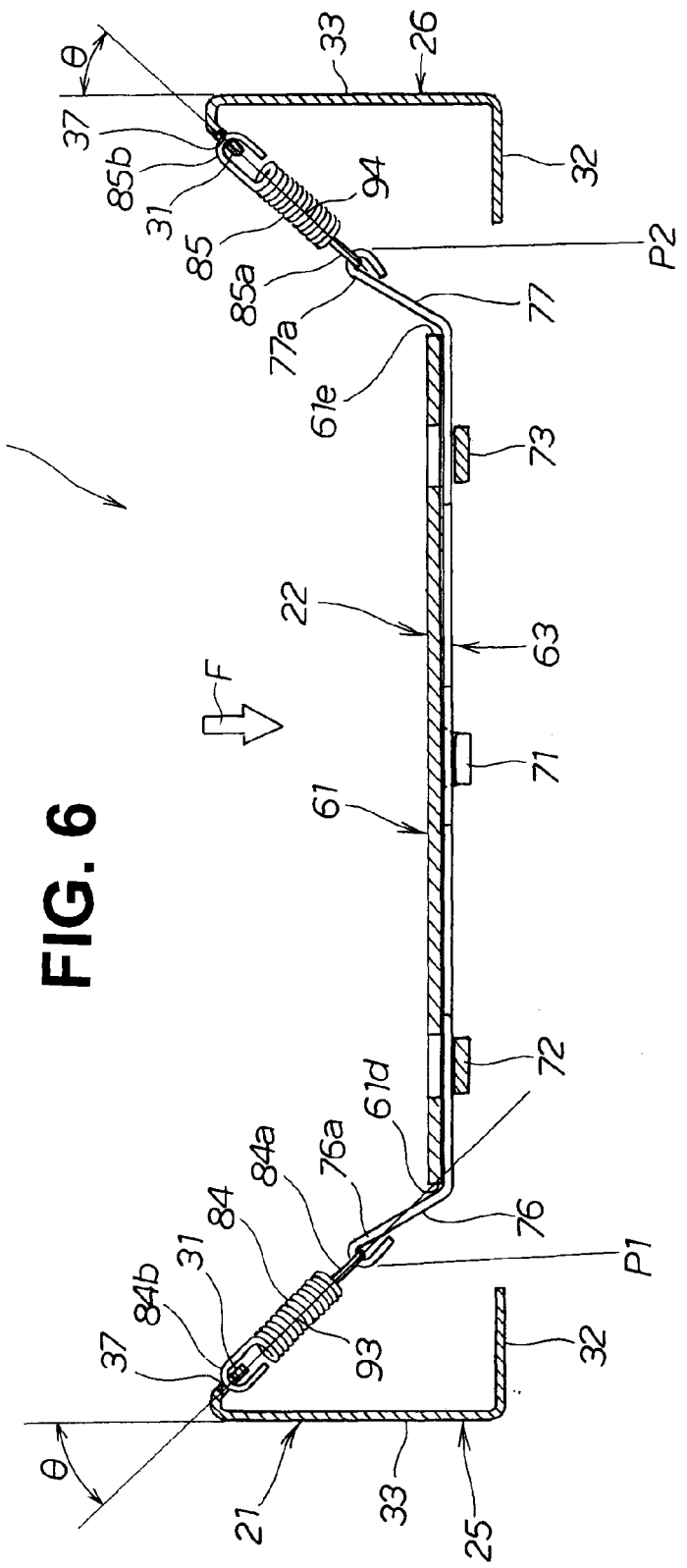
FIG. 6 is a cross-sectional view along the line 6-6 in FIG. 2.

The lower connecting wire 63 has a left extending portion 76 extending from a left-side lower portion 61d of the planar plate 61 towards the left lateral frame 25 (see also FIGS. 3 and 4), and a right extending portion 77 extending from a right-side lower portion 61e of the planar plate 61 towards the right lateral frame 26 (see also FIG. 6).

As shown in FIGS. 3 and 4, the left extending portion 76 extends so as to pitch upwards towards the front of the vehicle body, and has a left inner connecting portion 76a at a distal end portion (see also FIG. 6). In the left inner connecting portion 76a of the left extending portion 76, the distal end portion of the left extending portion 76 is bent to form a connecting hole. The connecting hole at the left inner connecting portion 76a is a hole for connecting a rear hook (i.e., rear end) 84a of the left second spring 84. In other words, the rear hook 84a of the left second spring 84 is connected to the left inner connecting portion 76a of the left extending portion 76.

As shown in FIG. 6, the right extending portion 77 is a portion that is bilaterally symmetrical to the left extending portion 76. The right extending portion 77 extends so as to pitch upwards towards the front of the vehicle body, and has a right inner connecting portion 77a at a distal end portion. In the right inner connecting portion 77a of the right extending portion 77, the distal end portion of the right extending portion 77 is bent to form a connecting hole. The connecting hole at the right inner connecting portion 77a is a hole for connecting a rear hook (i.e., rear end) 85a of a right second spring 85. In other words, the rear hook 85a of the right second spring 85 is connected to the right inner connecting portion 77a of the right extending portion 77. The amount by which the left and right extending portions 76, 77 protrude from the planar plate 61 is greater than the amount by which the upper connecting wire 62 (see FIG. 5) protrudes from the planar plate 61.

As shown in FIGS. 1 and 2, the spring unit 23 has the pair of left and right first springs 81, 82 and the pair of left and right second springs 84, 85 for connecting the planar elastic body 22 to the seatback frame assembly 21.

As shown in FIG. 5, the left first spring 81 is a coil spring whose inner hook 81a connects to the connecting hole of the left inner connecting portion 62a and whose outer hook 81b is connected to the left outer connecting hole 51 of the left connecting bracket 46. The left inner connecting portion 62a is a portion that protrudes slightly from the left-side upper portion 61b of the planar plate 61 and forms a left-side upper portion of the planar elastic body 22.

The left connecting bracket 46 is provided to the upper half portion 25a of the left lateral frame 25 with the left leg pipe 41 interposed therebetween. Therefore, the left-side upper portion of the planar elastic body 22 (i.e., the left inner connecting portion 62a) is connected to the left lateral frame 25 with the left first spring 81 interposed therebetween. In a state described above, the left first spring 81 is provided so that an axial line 91 is oriented substantially in the vehicle width direction. Therefore, a load F applied towards the rear of the vehicle body ("rearward load" hereafter) acts in a direction that intersects (i.e., substantially perpendicular to) the axial line 91 of the left first spring 81.

The right first spring 82 is a coil spring whose inner hook 82a is connected to the connecting hole of the right inner connecting portion 62b and whose outer hook 82b is connected to the right outer connecting hole 52 of the right connecting bracket 47. The right inner connecting portion 62b is a portion that protrudes slightly from the right-side upper portion 61c of the planar plate 61 and forms a right-side upper portion of the planar elastic body 22.

The right connecting bracket 47 is provided to the upper half portion 26a of the right lateral frame 26 with the right leg pipe 42 interposed therebetween. The right-side upper portion (i.e., the right inner connecting portion) 62b of the planar elastic body 22 is connected to the right lateral frame 26 with the right first spring 82 interposed therebetween. In a state described above, the right first spring 82 is provided so that an axial line 92 is oriented substantially in the vehicle width direction. Therefore, a rearward load F acts in a direction that intersects (i.e., substantially perpendicular to) the axial line 92 of the right first spring 82.

As described above, left- and right-side upper portions (i.e., left and right inner connecting portions 62a, 62b) of the planar elastic body 22 are respectively connected to the left and right lateral frames 25, 26 with left and right first springs 81, 82. Therefore, as shown in FIGS. 1 and 2, the planar elastic body 22 can be suspended with the left and right first springs 81, 82, and the planar elastic body 22 can be positioned using the left and right first springs 81, 82. In other words, the pair of left and right first springs 81, 82 has a positioning function.

As shown in FIG. 6, the left second spring 84 is a coil spring whose rear hook 84a is connected to the left inner connecting portion (connecting hole portion) 76a of the left extending portion 76, and whose front hook 84b is connected to the front connecting hole 37 formed on the front wall portion 31 of the left lateral frame 25.

The left inner connecting portion 76a of the left extending portion 76 is a portion that protrudes from the left-side lower portion 61d of the planar plate 61 towards the left lateral frame 25, and forms a left-side lower portion of the planar elastic body 22. In other words, the left-side lower portion (i.e., left inner connecting portion 76a) of the planar elastic body 22 is connected to the left lateral frame 25 by the left second spring 84.

The left inner connecting portion 76a of the left extending portion 76 is provided at a position P1 further inward in the seat back width direction than the rear wall portion 32 of the left lateral frame 25. In the state described above, the left second spring 84 is provided so that an axial line 93 of the left second spring 84 is oriented at an incline angle θ relative to the longitudinal direction of the vehicle body.

The axial line 93 of the left second spring 84 is disposed so as to be oriented further forward of the seatback frame assembly 21 than the axial line 91 of the left first spring 81 (FIG. 5). Having the axial line 93 of the left second spring 84 oriented obliquely with respect to the longitudinal direction of the vehicle body makes it possible for the left inner connecting portion 76a, which is the left-side lower portion of the planar elastic body 22, to be pulled further forward than the left first spring 81, relative to the vehicle body.

The right second spring 85 is a coil spring whose rear hook 85a is connected to the right inner connecting portion (i.e., a connecting hole portion) 77a of the right extending portion 77, and whose front hook (front end) 85b is connected to the front connecting hole 37 formed on the front wall portion 31 of the right lateral frame 26.

The right inner connecting portion 77a of the right extending portion 77 is a portion that protrudes from the right-side lower portion 61e of the planar plate 61 towards the right lateral frame 26 and forms a right-side lower portion of the planar elastic body 22. In other words, the right-side lower portion (i.e., the right inner connecting portion 77a) of the planar elastic body 22 is connected to the right lateral frame 26 by the right second spring 85.

The right inner connecting portion 77a of the right extending portion 77 is provided at a position P2 further inward in the seat back width direction than the rear wall portion 32 of the right lateral frame 26. In the state described above, the right second spring 85 is provided so that an axial line 94 of the right second spring 85 is oriented at an incline angle θ relative to the longitudinal direction of the vehicle body.

The axial line 94 of the right second spring 85 is disposed so as to be oriented further forward of the seatback frame assembly 21 than the axial line 92 of the right first spring 82 (FIG. 5). Having the right second spring 85 provided obliquely with respect to the longitudinal direction of the vehicle body makes it possible for the right-side lower portion 61e of the planar elastic body 22 to be pulled further forward than the right first spring 82, relative to the vehicle body.

As described above, left- and right-side lower portions (i.e., left and right inner connecting portions 76a, 77a) of the planar elastic body 22 are respectively connected to the pair of left and right lateral frames 25, 26 with the pair of left and right second springs 84, 85. The left and right second springs 84, 85 pull the left and right inner connecting portions 76a, 77a of the planar elastic body 22 forward relative to the seatback frame assembly 21 (i.e., forward relative to the vehicle body). Therefore, the left and right second springs 84, 85 can be provided so as to be disposed substantially in the longitudinal direction of the vehicle.

When the rearward load F acts on the planar elastic body 22, the rearward load F can be made to act at an incline angle θ relative to the axial line 93 of the left second spring 84, and to act at an incline angle θ relative to the axial line 94 of the right second spring 85. In other words, the rearward load F can be made to act in a direction near that of the axial line 93 of the left second spring 84, and to act in a direction near that of the axial line 94 of the right second spring 85.

Therefore, the pair of left and right second springs 84, 85 can be made to elastically deform in a satisfactory manner in correspondence with the rearward load F. In other words, the pair of left and right second springs 84, 85 can be imparted with a function of adjusting reaction force characteristics.

Imparting the pair of left and right second springs 84, 85 with a function of adjusting reaction only the force characteristics, as described above, thus makes it possible to readily set the amount of bending (i.e., amount of stretching) of the pair of second springs 84, 85 simply by adjusting (i.e., setting) the spring force of the pair of second springs 84, 85 (i.e., the reaction force characteristics).

In other words, the pair of left and right first springs 81, 82 is imparted with a function of positioning the planar elastic body 22 with respect to the seatback frame assembly 21, and the pair of left and right second springs 84, 85 is imparted a function of adjusting reaction force characteristics, thereby dividing roles of each of the springs 81, 82, 84, 85, making it possible to readily set the amount of rearward movement of the vehicle occupant and the planar elastic body 22 during a rear collision simply by adjusting the reactive force characteristics of the pair of second springs 84, 85.

The rear hook 84a of the left second spring 84 is connected to the planar elastic body 22 at the position P1 further inward in the seat back width direction than the rear wall portion 32 of the left lateral frame 25. Similarly, the rear hook 85a of the right second spring 85 is connected to the planar elastic body 22 at a position P2 further inward in the seat back width direction than the rear wall portion 32 of the right lateral frame 26.

The left second spring 84 can be prevented from interfering with the rear wall portion 32 of the left lateral frame 25 and the right second spring 85 can be prevented from interfering with the rear wall portion 32 of the right lateral frame 26 when the pair of left and right second springs 84, 85 is stretched. It is thereby made possible to prevent the rear wall portion 32 of each of the pair of left and right lateral frames 25, 26 from blocking the rearward movement of the planar elastic body 22, which in turn makes it possible for the planar elastic body 22 to move (recede or be displaced) rearward by a satisfactory amount.

Each of left and right extending portions 76, 77 extends from left- and right-side lower portions 61d, 61e of the planar plate 61, respectively. The left extending portion 76 is connected to the left lateral frame 25 with the left second spring 84 interposed therebetween, and the right extending portion 77 is connected to the right lateral frame 26 with the right second spring 85 interposed therebetween. Therefore, the orientation of the pair of left and right second springs 84, 85 (i.e., the direction of reaction force) can be adjusted by varying the length of the left and right extending portions 76, 77.

Adjusting the orientation of the pair of left and right second springs 84, 85 (i.e., the direction of the reaction force) as described above makes it possible to adjust the spring force of the left and right second springs 84, 85 (i.e., the reaction force characteristics) in a more satisfactory manner and to set the amount of bending (i.e., the amount of stretching) of the left and right second springs 84, 85 with greater ease.

Next, an example in which the vehicle occupant is supported by the seatback device 10 will be described with reference to FIGS. 7 through 9. Members forming the seatback device 10 are bilaterally symmetrical, so a description will be given for members on the left side only without adding a description for members on the right side.

As shown in FIG. 7, in an instance where another vehicle collides into the rear portion of the vehicle (i.e., a rear collision), an upper body 98 of a vehicle occupant 97 is thrust into the seat back 13 in relative terms. Therefore, a rearward load F acting towards the rear of the vehicle body acts on the planar elastic body 22 of the seat back 13.

As shown in FIG. 8(a), the rearward load F acts on the planar elastic body 22, and the left second spring 84 stretches as a result The rearward load F acts at an incline angle θ relative to the axial line 93 of the left second spring 84. Therefore, the rearward load F can be made to act in a direction near that of the axial line 93 of the left second spring 84.

By making the rearward load F to act in a direction near that of the axial line 93 of the left second spring 84, the left second spring 84 can be made to elastically deform in a satisfactory manner in correspondence with the rearward load F. The left second spring 84 can thereby be made to stretch in a satisfactory manner, allowing a lower portion 22a of the 22 to be displaced by a large displacement amount S2 towards the rear of the vehicle body.

As shown in FIG. 8(b), the rearward load F acts on the planar elastic body 22, causing the left first spring 81 to stretch. The left first spring 81 is provided so that the axial line 91 is oriented in the vehicle width direction. Therefore, the rearward load F acts in a direction that intersects (substantially parallel to) the axial line 91 of the left first spring 81.

A component of the rearward load F that acts in the direction of the axial line 91 of the left first spring 81 is reduced. The amount of stretching of the left first spring 81 is thereby kept small, causing an upper portion 22b of the planar elastic body 22 to be displaced towards the rear of the vehicle body by only a small amount S1.

Figure 9:
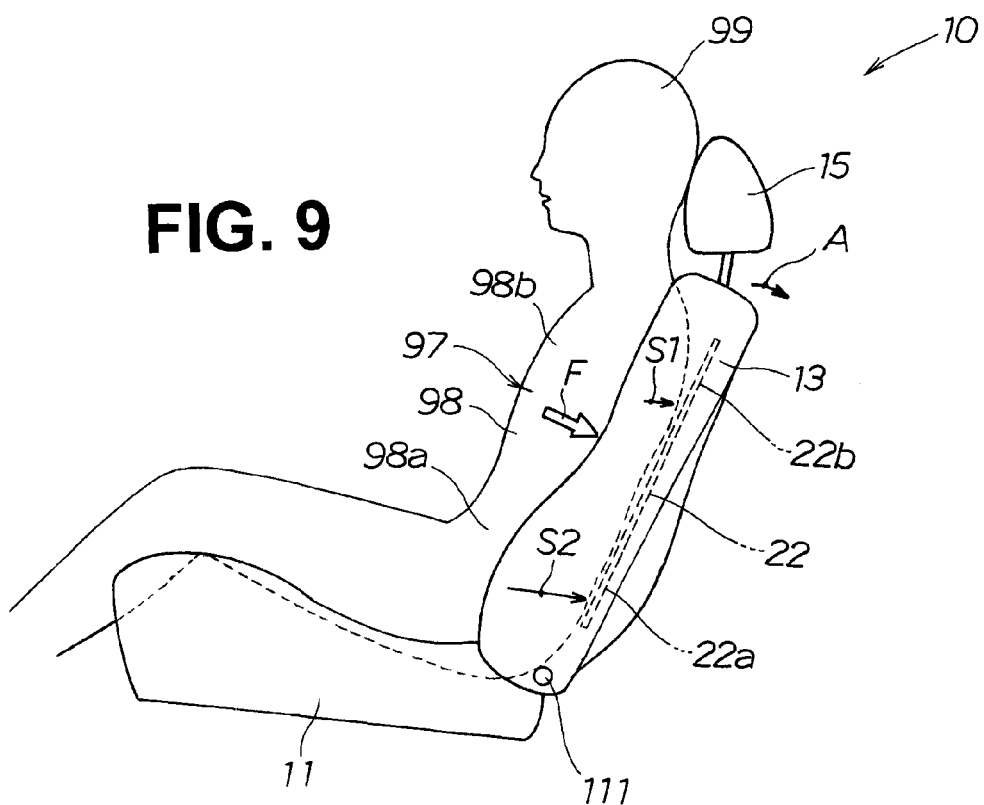
FIG. 9 is a drawing showing an example of the head of a vehicle occupant being supported by the seatback device shown in FIG. 7.

As shown in FIG. 9, when the rear collision thrusts the upper body 98 of the vehicle occupant 97 into the seat back 13 in relative terms, the rearward load F acting on the seat back 13 causes the seat back 13 to tilt slightly towards the rear of the vehicle body about a support shaft 111 as shown by arrow A. Therefore, unless the movement of the lower portion (i.e., the waist portion) 98a of the vehicle occupant 97 towards the vehicle rear is greater than that of the upper portion (i.e., the chest portion) 98b, it is difficult for the movement of the head 99 of the vehicle occupant 97 to reach the head rest 15.

Figure 8:
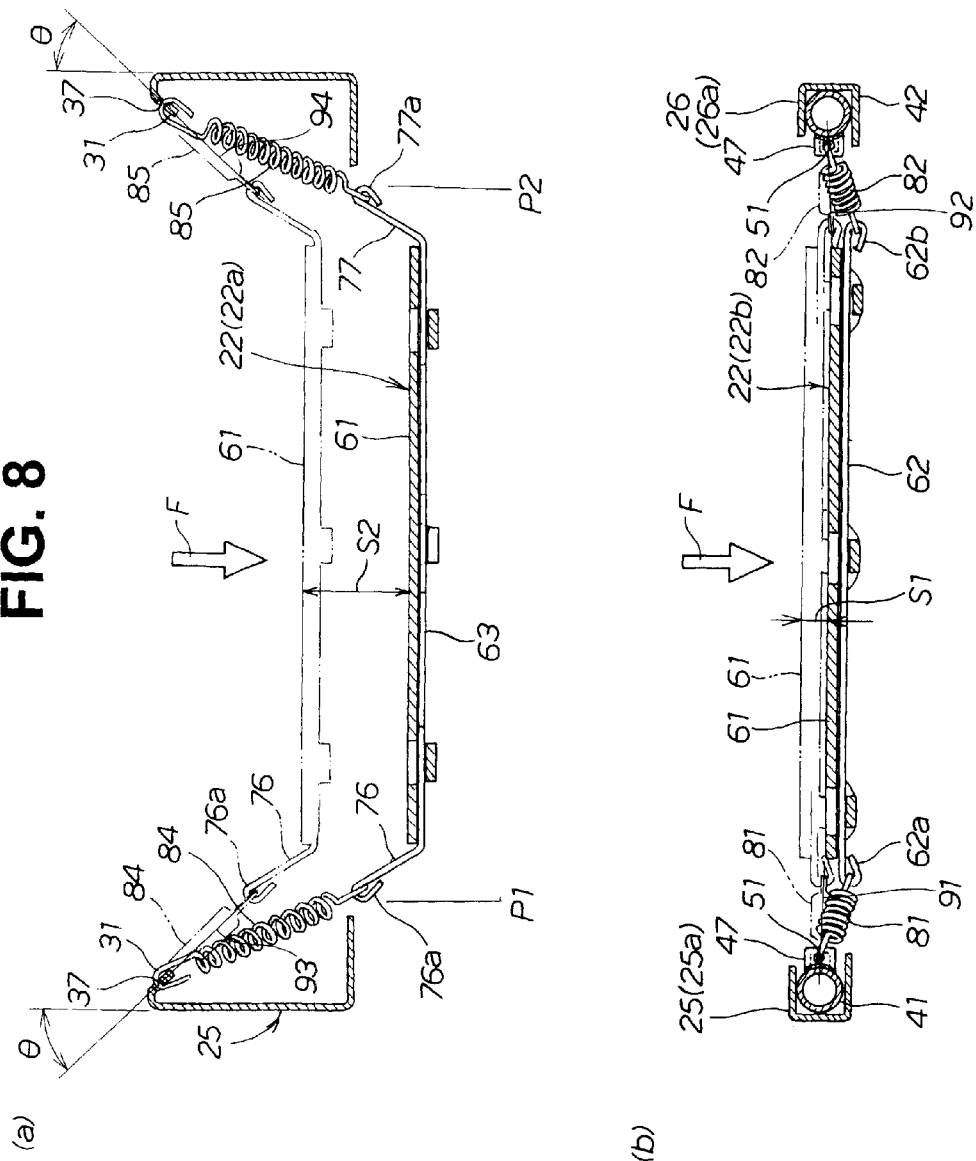
FIG. 8 is a drawing showing an example of a rearward displacement of a planar elastic body of the seatback device according to the present embodiment.

Therefore, as shown in FIG. 8, the lower portion 22a of the planar elastic body 22 is displaced towards the rear of the vehicle body by a large displacement amount S2, and the upper portion 22b of the planar elastic body 22 is displaced towards the rear of the vehicle body by a small displacement amount S1. The upper body 98 of the vehicle occupant 97 can thereby be caused to move towards the rear of the vehicle body in a satisfactory manner without deviating from the normal driving posture, and the head 99 of the vehicle occupant 97 can be caused to move in a satisfactory manner so as to reach the head rest 15, making it possible to adequately support the head 99 with the head rest 15.

The seatback device 10 according to the present invention is not limited to the embodiment described above, and may be modified or enhanced as appropriate. In the embodiment, a description was given for an example in which the left and right extending portions 76, 77 of the lower connecting wire 63 respectively extend from the left and right-side lower portions 61d, 61e of the planar plate 61, and the inner connecting portions 76a, 77a of the left and right extending portions 76, 77 respectively form the left- and right-side lower portions of the planar elastic body 22; however, this description is not provided by way of limitation to the scope of the invention. For example, the left and right-side lower portions 61d, 61e of the planar plate 61 may be provided so as to extend leftwards and rightwards respectively, wherein extended portions form the left- and right-side lower portions of the planar elastic body 22.

In the present embodiment, a description was given for an example in which the left and right inner connecting portions 62a, 62b protrude slightly from the left and right-side upper portions 61b of the planar plate 61, and the left and right inner connecting portions 62a, 62b form the left- and right-side upper portion of the planar elastic body 22; however, this description is not provided by way of limitation to the scope of the invention. For example, the left and right-side upper portions 61b, 61c of the planar plate 61 may be provided so as to protrude leftwards and rightwards respectively, wherein extended portions form left- and right-side upper portions of the planar elastic body 22.

Also, in the present embodiment, an elastically deformable rod was described as an example of upper and lower connecting wire 62, 63; However, this description is not provided by way of limitation to the scope of the invention. A non-elastically deformable rod may instead be used for the upper and lower connecting wire 62, 63.

The angle θ of the inclination of the left and right second springs 84, 85 shown in the present embodiment may be selected as desired.

In the embodiment, a description was also given for an example in which the left and right extending portions 76, 77 extend at an incline towards the front of the vehicle body. However, this description is not provided by way of limitation to the scope of the invention. The left and right extending portions 76, 77 may be provided so as to extend along the vehicle width direction.

In the embodiment, a description was also given for an example in which left and right connecting brackets 46, 47 are respectively provided to left and right leg pipes 41, 42, and left and right first springs 81, 82 are respectively connected to each of the left and right connecting brackets 46, 47; however, this description is not provided by way of limitation to the scope of the invention. For example, the left and right first springs 81, 82 may be directly connected to the left and right lateral frames 25, 26 respectively.

In the embodiment, a description was also given for an example of a seatback device having a seat back 13 that tilts slightly towards the rear of the vehicle body under a rearward load F; however, the description is not provided by way of limitation to the scope of the invention. The present invention may be applied to a seatback device having a seat back that does not tilt towards the rear of the vehicle body under a rearward load F.

The shape of the seatback frame assembly 21, the planar elastic body 22, the pair of left and right lateral frames 25, 26, the front wall portion 31, the rear wall portion 32, the side wall portion 33, the left extending portion 76, the right extending portion 77, the left first spring 81, the right first spring 82, the left second spring 84, the right second spring 85, and other components are not limited to those described in the example; and may be modified as appropriate.

Industrial Applicability

The present invention is suitable for use in a vehicle having a seatback frame comprising left and right lateral frames in a seatback frame, wherein a planar elastic body is elastically supported between the left and right lateral frames.

Reference Numerals:
10 Seatback device
17 Cushioning material
21 Seatback frame assembly
22 Planar elastic body
25, 26 Pair of left and right lateral frames
31 Front wall portion
32 Rear wall portion
33 Side wall portion
76 Left extending portion
77 Right extending portion
81 Left first spring
82 Right first spring
84 Left second spring
84a Rear hook (rear end) of left second spring
84b Front hook (front end) of left second spring
85 Right second spring
85a Rear hook (rear end) of right second spring
85b Front hook (front end) of right second spring
91, 92, 93, 94 Axial line
P1, P2 Position inward in the width direction

The invention claimed is:

1. A seatback device comprising:
a seatback frame assembly including left and right lateral frames, a connecting frame extending between and interconnecting the left and right lateral frames, and a planar elastic body elastically disposed between and supported by the left and right lateral frames, said connecting frame including a left leg that is received by, and overlaps with, an upper portion of the left lateral frame, a right leg that is received by, and overlaps with, an upper portion of the right lateral frame, and a connecting portion connecting the right leg and the left leg to each other;
a left first spring interconnecting a left-side upper portion of the planar elastic body and the left leg of the connecting frame at a location that overlaps with the upper portion of the left lateral frame and having an axis extending substantially laterally of a vehicle;
a right first spring interconnecting a right-side upper portion of the planar elastic body and the right leg of the connecting frame at a location that overlaps with the upper portion of the right lateral frame and having an axis extending substantially laterally of the vehicle;
a left second spring interconnecting a left-side lower portion of the planar elastic body and the left lateral frame at a location below the left leg of the connecting frame and having an axis extending forward of the seatback frame assembly, the left second spring urging the left-side lower portion forward of the seatback frame assembly; and
a right second spring interconnecting a right-side lower portion of the planar elastic body and the right lateral frame at a location below the right leg of the connecting frame and having an axis extending forward of the seatback frame assembly, the right second spring urging the right-side lower portion forward of the seatback frame assembly.

2. The seatback device of claim 1, wherein the planar elastic body includes a left extending portion extending from the left-side lower portion of the planar elastic body towards the left lateral frame and connected to the left lateral frame through the left second spring, and a right extending portion extending from the right-side lower portion of the planar elastic body towards the right lateral frame and connected to the right lateral frame through the right second spring.

3. The seatback device of claim 1, wherein each of the left and right lateral frames has a front wall portion, a rear wall portion, and a side wall portion interconnecting outer end portions of the front wall portion and the rear wall portion, wherein the front wall portion, the rear wall portion and the side wall portion define a U-shape cross-section, wherein the left and right lateral frames are open toward each other in opposed relation to each other, wherein the left second spring has a front end connected to the front wall portion of the left lateral frame, and the right second spring has a front end connected to the front wall portion of the right lateral frame, and wherein the left second spring has a rear end spaced inward from an inner edge of the rear wall portion and connected to the planar elastic body, and the right second spring has a rear end spaced inward from an inner edge of the rear wall portion and connected to the planar elastic body.

4. A seatback device comprising:
- a seatback frame assembly including left and right lateral frames and a planar elastic body elastically disposed between and supported by the left and right lateral frames, said planar elastic body including a plate, an upper connecting wire extending laterally across a surface of said plate, and a lower connecting wire extending laterally across the surface of said plate;
- a left first spring interconnecting a left end of said upper connecting wire, which is disposed at a left-side upper portion of said plate, and the left leg of the connecting frame and having an axis extending substantially laterally of a vehicle;
- a right first spring interconnecting a right end of said upper connecting wire, which is disposed at a right-side upper portion of said plate, and the right leg of the connecting frame and having an axis extending substantially laterally of the vehicle;
- a left second spring interconnecting a left end of said lower connecting wire, which is disposed at a left-side lower portion of said plate, and the left lateral frame and having an axis extending forward of the seatback frame assembly, the left second spring urging the left-side lower portion forward of the seatback frame assembly; and
- a right second spring interconnecting a right end of said lower connecting wire, which is disposed at a right-side lower portion of said plate, and the right lateral frame and having an axis extending forward of the seatback frame assembly, the right second spring urging the right-side lower portion forward of the seatback frame assembly.

5. The seatback device of claim 4, wherein the lower connecting wire includes a left extending portion extending from the left-side lower portion of the planar elastic body towards the left lateral frame and connected to the left lateral frame through the left second spring, and a right extending portion extending from the right-side lower portion of the planar elastic body towards the right lateral frame and connected to the right lateral frame through the right second spring.

6. The seatback device of claim 1, wherein each of the left and right lateral frames has a front wall portion, a rear wall portion, and a side wall portion interconnecting outer end portions of the front wall portion and the rear wall portion, wherein the front wall portion, the rear wall portion and the side wall portion define a U-shape cross-section, wherein the left and right lateral frames are open toward each other in opposed relation to each other, wherein the left second spring has a front end connected to the front wall portion of the left lateral frame, and the right second spring has a front end connected to the front wall portion of the right lateral frame, and wherein the left second spring has a rear end spaced inward from an inner edge of the rear wall portion and connected to the planar elastic body, and the right second spring has a rear end spaced inward from an inner edge of the rear wall portion and connected to the planar elastic body.

\* \* \* \* \*